(12) United States Patent
Wenninger et al.

(10) Patent No.: US 6,908,672 B2
(45) Date of Patent: Jun. 21, 2005

(54) ADHESIVE TAPE PARTICULARLY FOR PACKAGING USE

(75) Inventors: Dieter Wenninger, Hamburg (DE); André Galle, Hamburg (DE); Ernesto Biasoli, Gavirate (IT); Fabio Guzzetti, Arese (IT)

(73) Assignee: tesa AG, Hamburg (DE)

( * ) Notice: Subject to any disclaimer, the term of this patent is extended or adjusted under 35 U.S.C. 154(b) by 74 days.

(21) Appl. No.: 10/105,832

(22) Filed: Mar. 25, 2002

(65) Prior Publication Data

US 2003/0039823 A1 Feb. 27, 2003

(30) Foreign Application Priority Data

Aug. 3, 2001 (DE) .......................................... 101 37 620

(51) Int. Cl.$^7$ ............................... C09J 7/02; B32B 7/12
(52) U.S. Cl. ...................... 428/356; 428/343; 428/353; 428/354; 428/355 R
(58) Field of Search ................................ 428/343, 353, 428/354, 355 R, 356

(56) References Cited

U.S. PATENT DOCUMENTS

| | | | |
|---|---|---|---|
| 5,032,662 A | 7/1991 | Berger et al. ................. 528/25 |
| 5,760,135 A | 6/1998 | Korpman et al. | |
| 6,485,827 B2 * | 11/2002 | Griffith, Jr. et al. .......... 428/356 |
| 2003/0039823 A1 * | 2/2003 | Wenninger et al. .......... 428/343 |

FOREIGN PATENT DOCUMENTS

| | | | |
|---|---|---|---|
| DE | 1 935 684 | 2/1971 | |
| EP | 0 096 841 A1 | 12/1983 | |
| EP | 0 960 923 A1 | 12/1999 | |
| JP | 56-30481 | 3/1981 | |
| WO | WO 01/36011 A1 | 5/2001 | ........... A61L/15/58 |

OTHER PUBLICATIONS

Handbook of Adhesives, Second Edition, Ch 14, J. Autenrieth, pp. 222–241, (1977).*
JP 02 034680 19900205 Abstract Only.

* cited by examiner

*Primary Examiner*—Daniel Zirker
(74) *Attorney, Agent, or Firm*—Norris McLaughlin & Marcus PA

(57) ABSTRACT

A unilaterally self-adhesively coated adhesive tape, comprising: (a) a film based on thermoplastic polymers and (b) an adhesive layer applied to one side of the film, prepared from a mixture comprising: from 35 to 69.5 by weight of a natural rubber latex; from 20 to 64.5% by weight of a resin dispersion based on a hydrocarbon resin; from 0.5 to 20% by weight of an oil-based additive; and from 0.001 to 3% by weight of a defoamer based on an organically modified polysiloxane.

12 Claims, No Drawings

ADHESIVE TAPE PARTICULARLY FOR PACKAGING USE

The invention relates to an adhesive tape comprising a backing based on thermoplastic polymers and unilaterally coated with a solvent-free adhesive composition based on natural rubber latex and to the use of said adhesive tape as packaging tape.

Adhesive tapes with films based on polyolefins, such as biaxially oriented polypropylene, for example, and adhesive compositions based on solvent-containing natural rubber or aqueous acrylate dispersions are known and are supplied by known manufacturers.

A description is given, for example, in "Packaging Tapes" by Stefan Röber in Handbook of Pressure Sensitive Adhesive Technology, Third Edition, edited by Donatas Satas, Satas & Associates, Warwick, R.I. pp. 787–814. Further descriptions can be found in European Adhesives & Sealants 10(4), 1993, 29, by G. Pedala, and European Adhesives & Sealants 2(2), 1985, 18, by R. W. Andrew.

Owing to the known disadvantages associated with the production of solvent-containing adhesive tapes, such as, for example, the difficulty of recycling solvents, the emission of solvent to the environment, the workplace hazard due to highly flammable solvents, and the restriction on coating speed imposed by the drying of the adhesive composition, solvent-free technologies for producing adhesive tapes are advancing in importance.

A disadvantage to add to the above-described problems of the solvent technology is the need to break down the natural rubber during the production of the adhesive composition, in a process known as mastication. This results in the adhesive composition having a cohesiveness which decreases markedly in accordance with the extent of breakdown under mechanical load.

The deliberate industrial process of breaking down rubber under the combined action of shear stress, temperature, and atmospheric oxygen is referred to in the technical literature as mastication and is generally carried out in the presence of chemical auxiliaries, which are known from the technical literature as masticating agents or peptizers, or, more rarely, as "chemical plasticizing aids".

In rubber technology, the mastication step is needed in order to make it easier to integrate the additives.

Mastication is a term used in rubber technology for the breaking down of long-chain rubber molecules in order to increase the plasticity and/or reduce the (Mooney) viscosity of rubbers. Mastication is accomplished by treating natural rubber, in particular, in compounders or between rolls at very low temperatures in the presence of masticating agents. The high mechanical forces which this entails lead to the rubber molecules being "torn apart", with the formation of macroradicals, whose recombination is prevented by reaction with atmospheric oxygen. Masticating agents such as aromatic or heterocyclic mercaptans and/or their zinc salts or disulfides promote the formation of primary radicals and so accelerate the mastication process. Activators such as metal (iron, copper, cobalt) salts of tetraazaporphyrins or phthalocyanines permit a reduction in the mastication temperature. In the mastication of natural rubber, masticating agents are used in amounts from about 0.1 to 0.5% by weight in the form of masterbatches, which facilitate uniform distribution of this small amount of chemicals in the rubber mass.

Mastication must be clearly distinguished from the breakdown known as degradation which occurs in all of the standard solvent-free polymer technologies such as compounding, conveying, and coating in the melt.

Degradation is a collective term for diverse processes which alter the appearance and properties of plastics. Degradation may be caused, for example, by chemical, thermal, oxidative, mechanical or biological influences or else by exposure to radiation (such as (UV) light). Consequences are, for example, oxidation, chain cleavage, depolymerization, crosslinking, and/or elimination of side groups of the polymers. The stability of polymers toward degradation may be increased by means of additives: for example, by adding stabilizers such as antioxidants or light stabilizers.

The use of highly degraded adhesive compositions based on natural rubber hotmelt pressure-sensitive adhesives for adhesive tapes, especially packaging tapes, for sealing cartons made from recycled paper, or cardboard packaging, results in premature opening of the cartons. If there is sufficiently great tension across the lid of the carton, caused by the pressure of the packaged material in the carton or by the tension of the packaging material, which opposes sealing, the adhesive tape becomes detached from the surface of the carton and the carton opens as result of slippage of the packaging tape.

Adhesive tapes for cardboard packaging therefore cannot be produced with an adhesive composition which is based on natural rubber and is applied from nozzles. The cohesion of such compositions is not sufficient. When adhesive compositions based on natural rubber latex, i.e., water-based natural rubber, are used, there is no kind of mechanical degradation in the rubber. The adhesive compositions are therefore distinguished by excellent cohesion.

The cohesion and, with it, the packaging security afforded by adhesive tapes with an adhesive composition based on natural rubber may be improved either by crosslinking the rubber adhesive composition and/or by means of a variant preparation of the adhesive composition in the course of which the natural rubber used is broken down to a much-reduced extent and therefore has a higher molecular weight. This makes it possible to counter slippage of the adhesive tapes on the carton surface, as described above.

Solvent-free technologies for producing adhesive tapes, especially packaging tapes, have to date been restricted to the use of adhesive composition based on acrylate dispersions and to the use of melting, thermoplastic elastomers.

An advantage of these thermoplastic elastomers, predominantly block copolymers containing polystyrene blocks, is the relatively low softening point and the associated simplification of the application or coating process, and also the avoidance of the above-described disadvantages of the solvent-based technologies.

Further solvent-free systems based on aqueous adhesives, such as adhesive systems based on polyvinyl acetate, polyvinyl acetate-ethylene copolymers, neoprene, styrene-butadiene, polyurethane and polyvinyl alcohol, for example, are used little if at all owing to a price and/or performance structure which is unfavorable for adhesive tapes, particularly packaging tapes.

An overview of the most important aqueous adhesive systems and also their use is given in "Solvent free adhesives", T. E. Rolando (H. B. Fuller) in Rapra Rev. Rep. 1997, 9(5), 3–30 Rapra Technology Ltd.

Various routes to the solvent-free preparation and processing of pressure-sensitive rubber adhesives are known.

An overview of such adhesive compositions and their use in the field of pressure sensitive adhesives (PSAs) is given in "Natural Rubber Adhesives" (G. L. Butler in Handbook of Pressure Sensitive Adhesive Technology, Third Edition, edited by Donatas Satas, Van Nostrand Reinhold N.Y., pp. 261–287).

All of the known processes are characterized by very extensive rubber breakdown. For the further processing of the compositions for self-adhesive tapes, this necessitates extreme crosslinking conditions and also has the consequence of an application profile which is to some extent restricted, especially as regards the use of resultant self-adhesive tapes at relatively high temperatures. Solvent-free hotmelt PSAs based on nonthermoplastic elastomers, such as natural rubber or other high molecular weight rubbers, for example, lack sufficient cohesion for the majority of applications, in the absence of a step of crosslinking the adhesive composition, and are therefore unsuited to use in the context of an adhesive packaging tape. The reason for this failure of noncrosslinked adhesive compositions based on natural rubber is the relatively large reduction in molecular weight as a result of processing, and/or as a result of the preparation process of the adhesive compositions based on natural rubber, and the resultant reduced or inadequate cohesion of the adhesive compositions.

CA 698 518 describes a process for achieving production of a composition by adding high proportions of plasticizer and/or by simultaneously strong mastication of the rubber. Although this process can be used to obtain PSAs having an extremely high tack, the achievement of a user-compatible shear strength is possible only to a limited extent, even with a relatively high level of subsequent crosslinking, owing to the relatively high plasticizer content or else to the severe breakdown in molecular structure of the elastomer to a molecular weight average of $M_w \leq 1$ million.

The use of polymer blends, where besides nonthermoplastic natural rubber use is also made of block copolymers, in a ratio of approximately 1:1, represents essentially an unsatisfactory, compromise solution, since it results neither in high shear strengths when the self-adhesive tapes are used at relatively high temperatures nor in significant improvements on the properties described in CA 698 518.

Raw natural rubber latex is supplied from the plantations and is purified, preserved, and concentrated by means of appropriate methods. A general description of the types of latex and methods of processing is given in "Naturkautschuk—Technisches Informationsblatt" [Natural rubber—technical information sheet], Malaysian Rubber Producers Research Association, L1, 1977, and in "Kautschuktechnologie" [Rubber technology], Werner Hofmann, Gentner Verlag, Stuttgart p. 51 ff.

Natural rubber latex is harvested as a natural product from trees known as latex trees. After various processing steps for separation and purification, four basic types of natural rubber latices are distinguished:

1. Standard natural rubber latex with a high ammonia content of 0.7% by weight
2. Natural rubber latex with a low ammonia content of 0.2% by weight in combination with zinc oxide and tetramethylthiuram disulfide <0.035% by weight
3. Natural rubber latex doubly centrifuged, of particularly high purity
4. Natural rubber latex partly vulcanized, for specialty applications Mastication and the associated breakdown of the natural rubber is not necessary when preparing adhesive compositions based on natural rubber latex, since in the case of the solvent-free aqueous adhesive composition the simple mixing of the components is not accompanied by mastication and thus by a breakdown of the molecule under mechanical load. This results in a close interlooping of the natural rubber latex/isoprene molecules, a high molecular weight owing to absence of mastication, a broad molecular weight distribution, and a low softening point $T_g$.

These factors result in a very good balance between cohesion and adhesion in the adhesive composition resulting from resin blends, and also in a profile of properties which is of very high performance for adhesive tapes, over a very wide temperature range.

The preparation of aqueous adhesive compositions based on natural rubber latex is known. These adhesive compositions are used as described above for producing self-adhesive labels. In this context, the normal methods of preparing dispersion adhesives are used.

Also described is the preparation of adhesive systems which comprise natural rubber latex, in EP 0 960 923 A1. This discloses not only the preparation of dispersion adhesive compositions but also the introduction of natural rubber latex into other natural rubber adhesive systems by means of kneaders, mixers or extruders. The adhesive compositions prepared in this way can be coated onto films or nonwovens.

An improvement in the packaging properties of such adhesive tapes by means of controlled sustained crosslinking of the adhesive composition, which can also be used as part of a rational production process, is not described.

When using adhesive composition variants based on natural rubber latex—as already set out above—sustained crosslinking is unnecessary in order to achieve good packaging properties which are superior to those obtained with the majority of other adhesive composition systems.

Through the use of the above-described stabilizing resin dispersions and through the use of natural rubber latex, and thus in the absence of any mechanical degradation of the rubber, it is possible to produce, process, and coat-apply adhesive compositions based on natural rubber latex and so to produce adhesive tapes, because the adhesive composition exhibits a very high level of cohesion and hence optimum packaging security.

Not only for adhesive packaging tapes for carton sealing but also for other adhesive packaging tapes, such as strapping tapes, therefore, sufficient cohesion of the natural-rubber-based adhesive composition is therefor a necessity.

These positive characteristics over a wide temperature range are exploited for the adhesive tape described in JP 56 030 481, comprising an adhesive composition based on natural rubber latex. Through the use of the natural rubber latex, an insensitivity to impact at low temperatures is described.

A further point is that natural rubber latex features a particularly wide spectrum of applications. Thus natural rubber latex is suitable on the one hand for use as an adhesive composition for packaging materials and on the other hand for applications outside of adhesive technology.

A disadvantage of adhesive composition systems based on natural rubber latex is the poor stability of the natural rubber latex raw material to mechanical load and the associated coagulation of the natural rubber latex in the adhesive composition. This sensitivity to shearing restricts the ease of handling and the usefulness of the natural rubber latex for adhesive composition technology and the adhesive tape industry. The production of adhesive tapes wherein the adhesive composition comprising natural rubber latex can be coated at high speed onto a film has not hitherto been known.

Through the use of stabilizing resin dispersions and/or surface-active substances, such as emulsifiers, for example, it is possible to increase significantly the stability of the natural rubber latex. However, increasing the stability of natural rubber latex using surface-active substances at high concentrations goes hand in hand with a loss of cohesion of the adhesive composition, so that here there is a need to find a balance between stabilization and adequate cohesion.

The general use of natural rubber latex for adhesive compositions and also latex-stabilizing resin dispersions is described in "Tackified waterborne adhesive for PSA tapes", J. G. de Hullu, European Adhesives & Sealants, 12 (1998), pp. 11–12. Through the use of such natural rubber latex-stabilizing resin dispersions, it becomes possible to process or coat adhesive compositions based on natural rubber latex. The trouble-free application of the dispersion adhesive compositions to a polymeric backing enables an industrially practicable and economically rational adhesive tape production process. The use of this technology is made possible by employing a suitable adhesive composition and by technically setting and optimizing the coating lines.

The use of defoaming additives in aqueous adhesives is state of the art. Use is made here in particular of defoamers based on mineral oil, on modified fatty acids and fatty alcohols, on polyethers and silicones. When using aqueous adhesive compositions, defoamers may be necessary in order to ensure sufficiently low foaming for standard production.

A common feature of these defoamers is that, owing to their special surface-active effect in a large number of aqueous adhesive composition systems, they either exhibit a good defoaming action or ensure sufficient wettability of the aqueous adhesive composition on polymeric surfaces, such as polypropylene, for example. A simultaneously good antifoam effect and good wettability of the adhesive composition on polymeric surfaces cannot be achieved with these types of defoamers.

Given an appropriate defoaming action, craters are formed when the aqueous adhesive composition is spread onto polymeric surfaces.

Accordingly, the use of specially modified defoamers for aqueous adhesive compositions, generating both a sufficient defoaming effect and sufficient wetting of the adhesive composition on polymer surfaces, has not hitherto been known.

The application and development of an adhesive tape which unwinds quietly and is suitable for packaging applications was not described by J. G. de Hullu. The use of adhesive tapes with quiet unwind, particularly for carton sealing, however, is of great importance within the packaging industry in order to reduce the noise load in the packing houses and hence to increase work performance. The capacity for quiet unwinding is of fundamental importance in order to position an adhesive packaging tape within the middle to top price/performance segment.

Adhesive packaging tapes for carton sealing are applied manually or mechanically in the packaging industry. Here, and especially in large packaging lines and in large packaging halls, the quiet and nonclattering unwind is an additional advantage of adhesive packaging tapes, in order to make working more pleasant. This is an essential quality feature for adhesive packaging tapes in Europe.

In this context, quiet adhesive tapes give measurements of less than 80 dB (A) at a distance of 25 cm, whereas loud, clattering adhesive packaging tapes attain much higher dB(A) levels.

Adhesive tapes presently on the market, with a backing based on polypropylene, can be subdivided into the following variants according to the adhesive composition:
  Adhesive tapes with an adhesive composition based on solventborne natural rubber (a),
  a styrene-isoprene-styrene hotmelt pressure sensitive adhesive (b), and
  a water-based acrylate dispersion (c)
(a) Polypropylene-based adhesive packaging tapes with an adhesive composition based on solventborne natural rubber run quietly given an appropriate composition. A soft, flexible composition is necessary for this purpose. In the majority of cases, however, such adhesive tapes are provided with a solventborne carbamate coating in order to reduce the unwind force. As a result of the reverse-face coating, unwinding of the adhesive tape is loud and clattering.
(b) Polypropylene-based adhesive packaging tapes with an adhesive composition based on styrene-isoprene-styrene hotmelt PSAs can be used only in conjunction with a suitable reverse-face coating. Without reverse-face coating, the unwind force of the adhesive tape is so high, owing to the chemical structure of the composition, that the backing is damaged during unwind and, consequently, the packaging properties are severely decreased. The reverse-face coating, usually involving solventborne carbamate coatings, results in the adhesive tape exhibiting extremely loud and clattering unwind.
(c) Polypropylene-based adhesive packaging tapes with an adhesive composition based on water-based acrylates are used in combination with a corona treatment of the reverse face, i.e., the side of the backing that faces away from the adhesive composition. Without appropriate corona treatment of the reverse face, the unreeling of the adhesive tapes is loud and clattering. With appropriately set corona treatment of the reverse face, it is possible to obtain quiet and clatter-free unreeling of the adhesive packaging tapes.

This is described in EP 0 096 841 A1. This corona treatment of the backing reverse face, carried out for example after coating during the cutting process, increases the unwind force of the adhesive tapes and thus prevents flaking of the adhesive composition from the backing. This flaking of the adhesive composition from the backing on the basis of the unwind process leads to loud, clattering unwind. By means of the corona treatment of the reverse face to an appropriate extent, the adhesive tape acquires quiet unwind. The unwind force, and with it the unwind characteristics as well, are set and adjusted by appropriate corona treatment of the reverse face. At the present state of development, all adhesive tapes without reverse-face corona treatment exhibit loud unwind.

The corona treatment of the adhesive tapes is accompanied substantially by disadvantages. First, it entails an additional work step requiring additional machinery. In the case of corona treatment during a cutting process, only cutting machines with a cutting corona can be used. In some cases this necessitates additional acquisition of machinery. Secondly, the precise extent of the corona treatment is critical to achieving the desired effect. This brings with it a high degree of process uncertainty, necessitating increased quality control.

In the case of an inadequate corona output, the desired effect of quiet unwind is not fully achieved, and, since the resultant finished adhesive tapes cannot be aftertreated, production of reject product is the consequence. In the case of too strong a corona output, the unwind force is increased excessively, leading to backing overstretch, backing tear, or a transfer of the adhesive composition during the unwinding of the adhesive tape.

In the production of adhesive tapes with adhesive compositions based on natural rubber, both water-based and solventborne primers are used as adhesive promoters between adhesive composition and backing film. These adhesive promoters that are used possess in part a crosslinking effect on the natural-rubber-based adhesive composition which is applied from solution.

In general terms, natural rubber latex is a known component of adhesive compositions. The fields of use of such adhesive compositions based on natural rubber latex are applications in the sector of labels and plaster technology.

Monoaxially and biaxially oriented films based on polypropylene are used in large quantities for adhesive packaging tapes. Whereas biaxially oriented films based on polypropylene are preferred for the use of adhesive packaging tape for carton sealing, monoaxially oriented polypropylene films find application in the strapping tapes segment. These films are notable for very high tensile strength and low extension in the longitudinal direction and are highly suited to bundling and palletization. When using adhesive compositions which exhibit inadequate cohesion or inadequate anchoring of the adhesive composition to the film, the slippage of the strapping tapes results in slipping of the pallets and thus in inadequate securement of the pallets. Insufficient anchoring of the adhesive composition on the film leads, when using carton sealing tapes, to premature opening of the packed cartons.

Thermoplastic films based on polyvinyl chloride (PVC) are used to produce adhesive tapes by a variety of manufacturers. Particularly films based on PET are distinguished by high elongation at break and thermal stability of from 130° C. to 175° C., and resistance toward dilute alkalis and acids. Moreover, films based on polyesters possess a very high abrasion resistance and penetration resistance, but are less widespread in the field of adhesive packaging tapes owing to their relatively high price in relation to polyolefin-based films.

It is an object of the present invention to provide adhesive tapes comprising films based on thermoplastic polymers and solventlessly prepared, water-based adhesive compositions based on natural rubber latex, the adhesive composition being distinguished by low foaming and good wetting properties during coating and during processing, respectively. Furthermore, the adhesive tapes ought to unwind easily and quietly.

Additionally, the novel adhesive tapes ought to possess outstanding suitability for use as packaging tapes for commercial cardboard packaging.

This object is achieved by means of an adhesive tape as specified in the main claim. The subclaims relate to advantageous developments of the subject matter of the invention. Furthermore, the invention provides proposals for using the adhesive tape of the invention.

The invention accordingly provides a unilaterally self-adhesively coated adhesive tape comprising a film based on thermoplastic elastomers.

The film is provided on one side with an adhesive layer prepared from a mixture comprising
- 35 to 69.5% by weight of a natural rubber latex,
- 20 to 64.5% by weight of a resin dispersion based on a hydrocarbon resin,
- 0.5 to 20% by weight of an oil-based additive, and
- 0.001 to 3% by weight of a defoamer based on organically modified polysiloxanes (OMS)

Surprisingly, and entirely unexpected for the skilled worker, it is found that, when using organically modified polysiloxanes for the adhesive composition based on natural rubber latex, and a backing based on thermoplastic polymers, very low foaming can be brought about in the context of the adhesive composition, which nevertheless exhibits excellent wetting of the polymeric surface on coating.

Films which may be used in accordance with the invention include monoaxially and biaxially oriented films based on polyolefins, then films based on oriented polyethylene or oriented copolymers containing ethylene and/or polypropylene units, and possibly also PVC films, PET films, films based on vinyl polymers, polyamides, polyesters, polyacetals, polycarbonates.

The film is preferably composed of oriented polyolefins and/or has a thickness of between 20 and 50 $\mu$m.

Monoaxially oriented polypropylene is notable for its very high tensile strength and low elongation in the longitudinal direction and is used, for example, to produce strapping tapes. Monoaxially oriented films based on polypropylene are particularly preferred for producing the adhesive tapes of the invention, especially for bundling and palletizing cardboard packages and other goods.

The thicknesses of the monoaxially oriented films based on polypropylene are preferably between 25 and 200 $\mu$m, in particular between 40 and 130 $\mu$m.

Monoaxially oriented films are predominantly single-layered, although multilayer monoaxially oriented films may also be produced in principle. The known films are predominantly one-, two- and three-layer films, although the number of layers chosen may also be greater.

For the production of the adhesive tapes of the invention, used among other things for secure carton sealing, particular preference is further given to biaxially oriented films based on polypropylene with a draw ratio in the longitudinal (machine) direction (MD) of between 1:4 and 1:9, preferably between 1:4.8 and 1:6, and a draw ratio in the transverse (cross) direction (CD) of between 1:4 and 1:9, preferably between 1:4.8 and 1:8.5.

The moduli of elasticity achieved in the machine direction, measured at 10% elongation in accordance with ASTM D882, are usually between 1 000 and 4 000 N/mm$^2$, preferably between 1 500 and 3 000 N/ mm$^2$.

The thicknesses of the biaxially oriented films based on polypropylene are in particular between 15 and 100 $\mu$m, preferably between 20 and 50 $\mu$m.

Biaxially oriented films based on polypropylene may be produced by means of blown film extrusion or by means of customary flat film units. Biaxially oriented films are produced both with one layer and with a plurality of layers. In the case of the multilayer films, the thickness and composition of the different layers may also be the same, although different thicknesses and compositions are also known.

Particularly preferred for the adhesive tapes of the invention are single-layer, biaxially or monoaxially oriented films and multilayer biaxial or monoaxial films based on polypropylene which have a sufficiently firm bond between the layers, since delamination of the layers in the course of the application is disadvantageous.

The adhesion of the adhesion promoter on the thermoplastic film based on polyolefins may be improved by means of corona treatment or flame pretreatment, since, especially, the surfaces of the films based on oriented polyolefins may be treated by means of these widely known processes, such as corona treatment or flame treatment. Preference is given to surface treatments by corona treatment.

An overview of the processes for surface treatment is contained, for example, in the article "Surface pretreatment of plastics for adhesive bonding", A. Kruse; G. Krüger, A. Baalmann and O. D. Hennemann; J. Adhesion Sci. Technol., Vol. 9, No. 12, pp. 1611–1621 (1995).

The biaxially oriented films for the adhesive tapes of the invention are corona- or flame-pretreated on the side facing the composition or, where present, the adhesion promoter, but preferably are not surface-treated and/or corona- or flame-pretreated on the side remote from the composition.

In another preferred embodiment of the invention, an adhesion promoter is present between the optionally flame- or corona-treated film and the adhesive layer, and guarantees the effective bonding of the adhesive composition to the film and the crosslinking of the adhesive composition.

The adhesion promoter used optionally between adhesive composition and backing film optimizes the bond between the specified layers.

The application rate of the adhesive layer is in particular from 10 to 45 g/m². In one preferred embodiment, the application rate set is from 13 to 28 g/m².

In one particularly preferred variant, the adhesive compositions of the adhesive tapes of the invention include from 45 to 60% by weight of natural rubber latex. Also in accordance with the invention are other natural rubber latices and also mixtures of different types of natural rubber latices.

Depending on application, the following components— chosen independently of one another—may be added to the adhesive composition:
a) from 0.05 to 20% by weight of at least one color pigment
b) from 0.05 to 10% by weight of at least one stabilizer, and/or
c) from 0.1 to 5% by weight of an aging inhibitor The raw material used for the adhesive tapes of the invention is preferably standard natural rubber latex with an ammonia content of 0.7% by weight, firstly because the natural rubber latex mentioned offers price advantages and secondly because its relatively high ammonia content provides the natural rubber latex with effective stabilization. Substantially, natural rubber latex is very highly suitable for the use of adhesive compositions for adhesive tapes. Owing to the latex's very high molecular weight, the interlooping of the molecule chains, low glass transition temperature, and absence of mastication during the preparation of the adhesive compositions, adhesive compositions based on natural rubber latex display an excellent balance between adhesion and cohesion.

These properties ensure a very high level of packaging security when adhesive tapes comprising a natural rubber latex-based adhesive composition are used, especially in connection with the use of critical carton types and low temperatures.

The mechanical stability of the natural rubber latex may be critical with regard to mechanical shearing loads. Strong mechanical shearing loads lead to coagulation of the natural rubber latex, meaning that it cannot be processed. Possibilities for stabilizing the adhesive compositions based on natural rubber latex toward mechanical loads include firstly the use of appropriate stabilizing resin dispersions and secondly the use of emulsifiers.

The adhesive tapes of the invention preferably comprise natural rubber latex at between 30% to 64.5% by weight of the standard natural rubber latex with a high ammonia content.

Aqueous resin dispersions, i.e., dispersions of resin in water, are known. Their preparation and properties are described, for example, in "Resin Dispersions", Anne Z. Casey in Handbook of Pressure Sensitive Adhesive Technology, Second Edition, edited by Donatas Satas, Van Nostrand Reinhold N.Y., pp. 545–566.

Dispersions of hydrocarbon resins are likewise known and are offered, for example, by Hercules BV under the trade name Tacolyn.

For the adhesive tapes of the invention, resin dispersions based on hydrocarbon resins or modified hydrocarbon resins as principal resin component are used. The adhesive composition comprises between 35 to 69.5% by weight of the resin dispersion and preferably between 40 to 55% by weight of the resin dispersion. The solids content of the resin dispersion is in particular between 40 and 69.5% by weight, preferably between 45 and 60% by weight.

Also in accordance with the invention is the use of resin dispersions based on mixtures of different hydrocarbon resins and also on mixtures of inventive hydrocarbon resins with other resins.

Likewise known are resin dispersions based on modified hydrocarbons, and of particular interest in this context are C5/C9 hydrocarbon resin dispersions which have been modified with aromatics. The polarity of the resin dispersion and thus of the adhesive composition may be adjusted by way of the proportion of aromatics. As well as the polarity of the adhesive composition, the hardness of the resin is influenced. The lower the aromatics content, the lower the polarity of the modified hydrocarbon resin dispersion.

The adhesive tapes of the invention contain from 0.05 to 20% by weight of an oil-based additive, in particular a mineral oil dispersed in water.

In one preferred embodiment of the adhesive tapes of the invention the adhesive composition contains from 2 to 12% by weight and, in a particularly preferred variant, from 3 to 10% by weight of a mineral oil dispersed in water.

Also in accordance with the invention is the use of mixtures of different oils dispersed in water, and the use of undispersed mineral oils.

Further in accordance with the invention is the use of different oils, such as mineral oils, natural oils, and synthetic oils, for example. Likewise in accordance with the invention is the use of mixtures of different oils. Likewise in accordance with the invention is the use of an aqueous oil dispersion or the direct use of oil together with a suitable emulsifier system.

The oils of the adhesive compositions of the invention are selected advantageously from the group of the apolar lipids. Particularly advantageous oils for the purposes of the present invention are those listed below.

| Manufacturer | Trade name | INCI name |
| --- | --- | --- |
| Total SA | Ecolane 130 | Cycloparaffin |
| Neste PAO N.V. (supplier: Hansen & Rosenthal) | Nexbase 2006 FG | Polydecene |
| EC Erdölchemie (supplier: Bayer AG) | Solvent ICH | Isohexadecane |
| DEA Mineralöl (supplier: Hansen & Rosenthal) Tudapetrol | Pionier 2076 | Mineral Oil |
| DEA Mineralöl (supplier: Hansen & Rosenthal) Tudapetrol | Pionier 6301 | Mineral Oil |
| EC Erdölchemie GmbH | Isoeikosan | Isoeicosane |
| Condea Chemie | Isofol 1212 Carbonate | |
| Gattefossé | Softcutol O | Ethoxydiglycol Oleate |
| Creaderm | Lipodermanol OL | Decyl Olivate |
| Henkel | Cetiol S | Dioctylcyclohexane |
| DEA Mineralöl (supplier: Hansen & Rosenthal) Tudapetrol | Pionier 2071 | Mineral Oil |

-continued

| Manufacturer | Trade name | INCI name |
| --- | --- | --- |
| WITCO BV | Hydrobrite 1000 PO | Paraffinum Liquidum |
| Condea Chemie | Isofol Ester 1693 | |
| Condea Chemie | Isofol Ester 1260 | |
| Unichema | Prisorine 2036 | Octyl Isostearate |
| Henkel Cognis | Cetiol CC | Dicaprylyl Carbonate |
| ALZO (ROVI) | Dermol 99 | Trimethylhexyl Isononanoate |
| ALZO (ROVI) | Dermol 89 | 2-Ethylhexyl Isononanoate |
| Paramelt | Diccera 11833 | Paraffinic oil |

The oil-based additive may be selected advantageously from the following group of substances:

mineral oils, mineral waxes oils, such as triglycerides of capric or of caprylic acid, but preferably castor oil;

fats, waxes, and other natural and synthetic fatty substances, preferably esters of fatty acids with alcohols of low carbon number, for example, with isopropanol, propylene glycol or glycerol, or esters of fatty alcohols with alkanoic acids of low carbon number or with fatty acids;

alkylbenzoates;

silicone oils such as dimethylpolysiloxanes, diethylpolysiloxanes, diphenylpolysiloxanes, and hybrid forms thereof.

The oils of the present invention are selected advantageously from the group consisting of esters of saturated and/or unsaturated, branched and/or unbranched alkane carboxylic acid with a chain length of from 3 to 30 carbon atoms and saturated and/or unsaturated, branched and/or unbranched alcohols with a chain length of from 3 to 30 carbon atoms, from the group consisting of esters of aromatic carboxylic acids and saturated and/or unsaturated, branched and/or unbranched alcohols with a chain length of from 3 to 30 carbon atoms. Such ester oils may then be selected advantageously from the group consisting of isopropyl myristate, isopropyl palmitate, isopropyl stearate, isopropyl oleate, n-butyl stearate, n-hexyl laurate, n-decyl oleate, isooctyl stearate, isononyl stearate, isononyl isononanoate, 2-ethylhexyl palmitate, 2-ethylhexyl laurate, 2-hexyldecyl stearate, 2-octyldodecyl palmitate, oleyl oleate, oleyl erucate, erucyl oleate, erucyl erucate, and synthetic, semisynthetic, and natural mixtures of such esters, jojoba oil for example.

The oils may further be selected advantageously from the group consisting of branched and unbranched hydrocarbons and hydrocarbon waxes, silicone oils, dialkyl ethers, from the group consisting of saturated or unsaturated, branched or unbranched alcohols, and also fatty acid triglycerides, mainly the triglyceryl esters of saturated and/or unsaturated, branched and/or unbranched alkane carboxylic acids with a chain length of from 8 to 24, in particular from 12 to 18, carbon atoms. The fatty acid triglycerides may be selected advantageously, for example, from the group consisting of synthetic, semisynthetic, and natural oils, examples being olive oil, sunflower oil, soya oil, groundnut oil, rapeseed oil, almond oil, palm oil, coconut oil, palm kernel oil, and the like.

Any desired blends of such oil components and wax components may also be used with advantage for the purposes of the present invention. It may also be advantageous, where appropriate, to use waxes, an example being cetyl palmitate, as the sole component.

The oils are preferably selected from the group consisting of 2-ethylhexyl isostearate, octyldodecanol, isotridecyl isononanoate, isoeicosan, 2-ethylhexyl cocoate, $C_{12-15}$-alkyl-benzoate, caprylic/capric triglyceride, and dicaprylyl ether.

Particularly advantageous mixtures are mixtures of $C_{12-15}$-alkylbenzoate and 2-ethyl-hexyl isostearate, mixtures of $C_{12-15}$-alkylbenzoate and isotridecyl isononanoate, and mixtures of $C_{12-15}$-alkylbenzoate, 2-ethylhexyl isostearate and isotridecyl isononanoate.

Of the hydrocarbons, liquid paraffin, squalane and squalene can be used with advantage for the purposes of the present invention.

In order that an adhesive composition based on natural rubber latex can be prepared and processed without problems it is necessary to provide the aqueous adhesive composition with a suitable defoamer. The use of defoamers based on organically modified polysiloxanes has proven particularly suitable for adhesive compositions based on natural rubber latex.

Defoaming additives based on organically modified polysiloxanes exhibits on the one hand an excellent foam-destroying action and at the same time the natural rubber latex-based adhesive composition displays crater-free wettability of the surface of the backing based on polypropylene. These characteristics are not inhibited by any other of the defoamers mentioned.

For the adhesive tapes of the invention, organically modified polysiloxanes are used as defoamers. The adhesive composition contains in particular from 0.001 to 3.0% by weight of a defoamer based on organically modified polysiloxanes. In one particularly preferred embodiment the adhesive composition contains from 0.01 to 1.0% by weight of a defoamer based on organically modified polysiloxanes. Also in accordance with the invention is the use of mixtures of different organically modified polysiloxanes.

Polysiloxanes are oxygen compounds of silicon of the general formula $H_3Si-[O-SiH_2]_n-O-SiH_3$. Where the hydrogen atoms are replaced by organic radicals, the compounds are referred to as polyorganosiloxanes. Systematically, silicones are referred to as polyorganosiloxanes.

All partly halogenated silanes, like the fully halogenated silanes, are rapidly decomposed by water to form oxygen derivatives of the monosilane. The hydrolysis products initially formed in this decomposition, however, are unstable and undergo condensation with elimination of water to form siloxanes and polysiloxanes. Wavy ring structures and cage structures are formed. In exactly the same way as for the siloxane parent structures, organically modified siloxanes can be prepared by substituting the hydrogen atoms by organic groups. These organically modified siloxanes are used as defoamers, for example, in PVC production or serve as defoaming additives in the textile industry. In particular, organically modified siloxanes are used wherever conventional silicones are not employed or are employed only in certain circumstances.

Defoamers based on organically modified polysiloxanes can be added to the aqueous adhesive composition at any point in time of formulation and are substances which form a coherent film at the liquid-gaseous interface and so make it possible for the medium to be degassed to form the smallest surface area and thus the lowest-energy state in a very short time, accompanied by destruction of the gas bubbles.

Aging inhibitors for adhesive compositions based on natural rubber are known. Three different kinds of aging inhibitor are used in particular as antioxidants for adhesive compositions: aging inhibitors based on amines, on dithiocarbamates, and on phenols. Phenol-based aging inhibitors are very effective under the influence of UV radiation and sunlight.

For the adhesive tapes of the invention, phenol-based aging inhibitors are used. The adhesive composition comprises in particular from 0.1 to 5% by weight of an aging inhibitor based on phenols. Also in accordance with the invention is the use of other types of aging inhibitor, such as aging inhibitors based on amines and dithiocarbamates, for example.

Organic and inorganic pigments for adhesive compositions based on natural rubber are known. For the coloring of adhesive compositions based on natural rubber, use is made in particular of titanium dioxide or of titanium dioxide in combination with different-colored color pigments.

For the adhesive tapes of the invention, suitable organic and/or inorganic color pigments are used in dispersion form. The adhesive composition preferably comprises from 0.05 to 20% by weight of an organic and/or inorganic color pigment. Also in accordance with the invention is the use of pigments based on mixtures of different organic and inorganic pigments.

Natural rubber latex can be stabilized by the use of suitable stabilizers against mechanical shear forces, and by this means the coagulation tendency can be reduced or suppressed entirely. Suitable stabilizers include additives based on potassium soaps of synthetic carboxylic acids. Other known stabilizers include ethoxylates having a degree of ethoxylation of more than 30.

The adhesive compositions of the invention may include from 0.05 to 10% by weight of suitable stabilizers.

The adhesive tapes of the invention may be produced by the known methods. An overview of customary production methods can be found, for example, in "Coating Equipment", Donatas Satas in Handbook of Pressure Sensitive Adhesive Technology, Second Edition edited by Donatas Satas, Van Nostrand N.Y., pp. 708–808. The known methods of drying and cutting the adhesive tapes are likewise to be found in the Handbook.

The adhesive tapes of the invention are suitable for a large number of adhesive tape applications. One important field of application is that of packaging applications. The adhesive tapes are suitable for use as carton sealing tapes, general adhesive packaging tapes, strapping tapes, and adhesive tapes for sealing plastic packaging and plastic bags. The adhesive tapes are suitable for pallet securement. Further applications are the bundling of loose goods and goods for transit, such as pipes, planks, etc. The adhesive tapes of the invention may be used to secure, for example, refrigerators and other electrical and electronic appliances when in transit. Further applications include label protection, surface protection, in the construction sector, for example, and tear-open strips for packaging. Applications within the office sector are also possible.

The adhesive packaging tapes have running lengths in particular of 66, 100 and 1 000 m. Common roll widths chosen are 18, 24, 36, 48, 50 and 72 mm.

The preferred colors are brown, white, and transparent. Printing is carried out on rolls 144 or 150 mm in width, which are then again cut to the abovementioned widths.

The unwind noise according to one outstanding embodiment of the invention, at a distance of 25 cm from the adhesive tape, is less than 80 dB(A).

The intention of the text below is to illustrate the invention, with reference to examples, without wishing unnecessarily to restrict the invention.

EXAMPLES

Example a

Film

A biaxially oriented film based on polypropylene is used, from Radici.

| | |
|---|---|
| Film thickness | 28 µm |
| Designation | Radil T |
| Company/manufacturer | Radici SpA |
| Elongation at break, MD | 130% |
| Elongation at break, CD | 50% |
| Modulus of elasticity, MD | 2 500 N/mm$^2$ |
| Modulus of elasticity, CD | 4 000 N/mm$^2$ |

The surface energy of the untreated BOPP film Radil T25 is less than 30 mN/m. The surface energy of the polypropylene surface which is coated with adhesion promoter is from 44 to 46 mN/m following corona treatment.

The surface energy of the untreated polypropylene surface of the film Radil T25 is less than 30 mN/m. This is the side of the film that is opposite to the adhesive composition.

Example b

Components

Components used:

| | |
|---|---|
| b1 | of the adhesive composition |
| b1.1 | natural rubber latex obtainable from Weber & Schaer, Hamburg (solids content 60%) |
| b1.2.1. | aqueous resin dispersion based on hydrocarbon resins (from Hercules BV, Tacolyn 1070, solids content 55% by weight; softening point 70° C.) |
| b.1.3. | aging inhibitor Lowinox 2246 from Great Lakes, USA |
| b1.4 | defoamer TEGO Antifoam 288 from Goldschmidt, Essen |
| b1.5 | Dicera 11833, oil dispersion from Paramelt, NL |
| b2 | of the primer |
| b2.1 | Trapylen 6965W (polypropylene dispersion with low level of chlorination, from Tramaco, Hamburg) or Butofan LS103 (styrene-butadiene dispersion from BASF) |

Example c

Formulations c1 formulation of A of the adhesive composition
The formulation is given in % by weight:

| | |
|---|---|
| Natural rubber latex dispersion | 47% by weight |
| Tacolyn 1070 | 47% by weight |
| Dicerra 11833 | 5% by weight |
| Aging inhibitor | 0.7% by weight |
| TEGO anitfoam 288 | 0.3% by weight | c2 formulation B of the primer
The formulation is given in % by weight:

| | |
|---|---|
| Trapylen 6965W or | 100% by weight |
| Butofan LS103 | 100% by weight |

Example d

Preparation of the Adhesive Composition and of the Primer

The adhesive compositions A to be coated (applied) are prepared as follows:

d1 the resin dispersion is added to the natural rubber latex at 23° C. with continual stirring with a customary mechanical stirrer. This is followed by careful stirring for 15 minutes more
d2 the aging inhibitor and the defoamer are stirred carefully into the mixture from step 1 (d1). Stirring is then continued for 15 minutes.
d3 the oil dispersion is stirred carefully into the mixture from step 2 (d2). Stirring is then continued for 15 minutes.
This is followed by coating.

The primer with formulation B is prepared as follows:

d4 Trapylen 6965W and Butofan LS103 are mixed and used without further pretreatment.

Example e

Coating

The film a is coated with the primer formulation B and with the adhesive composition formulation A by means of a wire doctor. In a first step the primer is applied, and briefly dried at from 80 to 90° C., and directly thereafter in a second step (inline or offline) the adhesive composition is applied to the primer layer.

The wire doctor and the coating speed are adjusted such that after drying of the coated film an adhesive application rate of approximately 18 g/m² is measured and a primer application rate of from 0.6 to 0.8 g/m² is measured. Coating takes place on a pilot coating plant with an operating width of 500 mm and at a coating speed of 10 m/min. Downstream of the coating station with its wire doctor applicator there is a drying tunnel which is operated with hot air (approximately 100° C.). The coated film is made processed in a width of 50 mm and a length of 60 m.

The technical adhesive data are determined following storage at 23° C. for two days and following storage at 23° C. for from one to three months.

Example f

Results

The test methods used are briefly characterized below:

To determine the adhesive application rate, a circular specimen of known surface area is cut from the coated film and weighed. The adhesive composition is then removed using petroleum spirit and the film, now free of adhesive composition, is weighed again. The adhesive application rate, in g/m², is calculated from the difference.

To characterize the tack with respect to cardboard, the adhesive tape is applied to the cardboard using a standard commercial manual roller and is pressed on using a steel roller weighing 2 kg (overrolled twice). After a waiting time of 3 minutes, the adhesive tape is peeled off parallel at a speed of about 30 m/min and at an angle of approximately 130° to the cardboard surface. The tack with respect to cardboard is assessed qualitatively on the basis of the amount of paper fibers torn out, in comparison with a standard commercial adhesive packaging tape such as tesa-pack 4124 from Beiersdorf, whose tack is characterized as being very good.

To determine the packaging security a standard carton (dispatch carton; 425 mm×325 mm×165 mm: length× breadth×height: from Europakarton; constructed from bicorrugated cardboard with a 125 g/m² kraftliner outer ply) is sealed with the adhesive tape using a standard commercial automatic packer (Knecht, model 6030 and sealing unit 6230, setting without braking path). The adhesive tape is applied centrally in a standard U-shaped seal so that 60 mm of adhesive tape are bonded at each of the end faces. Before sealing, the carton is completely filled with peas and is stored lying on its side face at 40° C. and at 23° C. The packaging security is characterized as being very good if the carton remains sealed for more than 30 days. Also characterized and described are the slippage of the adhesive tape on the carton and, respectively, the behavior of the adhesive tape at the bonded areas, and these qualities are compared with the reference adhesive tape (table 1).

The unwind noise is determined with the adhesive tape being unwound at a speed of 45 m/min. The unwind noise is measured in dB (A) at a distance of 25 cm from the center of the roll of adhesive tape, using a standard commercial sound level meter from Brüel & Kjear (type 2226). A measured sound level less than 80 dB (A) is classed as quiet.

The unwind force is measured at constant unwind speed (30 m/min) by measuring the torque and calculating the unwind force, in N/cm, in accordance with the known formulae.

The effectiveness of the defoamer is measured by measuring the foam height after the formulation under test has been stirred at 1 200 rpm for 5 minutes. The foam height is then measured, in millimeters.

The wettability and cratering of the adhesive compositions used are measured as a function of the defoamer on backings based on polyolefins, and constitute a visual estimate. For this estimate, the adhesive composition is spread as a thin film over a surface of untreated polyolefins or primed polyolefins, and the cratering is assessed for 1 to 2 minutes. If no craters or wetting problems occur after 1 to 2 minutes, the sample is assessed as being "good".

The assessment of the suitability of organically modified polysiloxanes as defoamers for aqueous adhesive compositions, particularly compositions based on natural rubber latex, in comparison to conventional defoamers is shown in table 1.

TABLE 1

Comparison of the defoamers

| | No defoamer | Standard defoamer A (for example, mineral oil-based) | Standard defoamer B (for example, low concentration silicone-based) | Defoamer based on organically modified polysiloxanes |
|---|---|---|---|---|
| Defoaming action | − − | + | − | + |
| Wetting of the adhesive composition on polyolefins | ++ | − | + | ++ |

(The standard defoamers included in this example were defoamers A and B, see table 1. The effectiveness and overall performance of the defoamer is very heavily dependent on concentration. 0.3% by weight defoamer was taken as the standard concentration, see formulation A, example c1)

The results of the investigation of an inventive adhesive tape with unembossed film and its assessment in relation to comparative adhesive tapes are given in table 2.

TABLE 2

Characteristics of the adhesive tapes of the invention

| Structure/<br>storage time/<br>temperature | Sample A | Sample B | Sample D |
|---|---|---|---|
| Adhesive composition | composition A | 4024PV2<br>acrylate dispersion | tesa 4089 with reverse-face coating solventborne natural rubber adhesive |
| Backing | film a | film a | film a |
| Primer | formulation B | no primer | standard primer |
| Adhesive application rate [g/m²] | 18–22 | 24 | 20 |
| Application rate primer layer [g/m²] | 0.8 | — | 0.6 |
| Anchoring of adhesive composition | good | good | good |
| Unwind behavior [loud/quiet] | quiet | quiet | quiet |
| Unwind force at 30 m/min [N/cm] | 4.3 | 4.5 | 0.7 |
| Packaging security | very good | good | good |
| Tack on cardboard | good | very good | good |

What is claimed is:

1. A unilaterally self-adhesively coated adhesive tape, comprising
   a. a film based on thermoplastic polymers,
   b. an adhesive layer applied to one side of the film, prepared from a mixture comprising
      from 35 to 69.5 by weight of a natural rubber latex,
      from 20 to 64.5 by weight of a resin dispersion based on a hydrocarbon resin,
      from 0.5 to 20% by weight of an oil-based additive, and
      from 0.001 to 3% by weight of a defoamer based on an organically modified polysiloxane.

2. The tape as claimed in claim 1, wherein the film is comprised of oriented polyolefins and/or has a thickness of between 20 and 50 $\mu$m.

3. The tape as claimed in claim 1, wherein the film is comprised of biaxially oriented polypropylene-based film and/or has a thickness of between 15 and 100 $\mu$m.

4. The tape as claimed in claim 1, wherein the film is comprised of monoaxially oriented polypropylene-based film and/or has a thickness of between 25 and 200 $\mu$m.

5. The tape as claimed in claim 1, which further comprises of a layer of a primer between the film and the adhesive layer.

6. The tape as claimed in claim 1, wherein the adhesive layer was applied to the film at a rate of 10 to 45 g/m².

7. The tape as claimed in claim 1, wherein the adhesive layer further comprises of optional ingredients selected from the group consisting of:
   from 0.1 to 5% by weight of an aging inhibitor,
   from 0.05 to 20% by weight of at least one color pigment, and/or
   from 0.05 to 10% by weight of a stabilizer; and
   mixtures thereof.

8. The tape as claimed in claim 1, wherein from 0.1 to 5% by weight based on the total weight of the tape of aging inhibitors based on phenols are added to the adhesive composition.

9. The tape as claimed in claim 1, wherein the unwind noise at a distance of 25 cm from the adhesive tape is less than 80 dB(A).

10. A method of sealing a paper package, said method comprising applying to said paper package to seal said paper package a tape as claimed in claim 1.

11. The tape as claimed in claim 3, wherein the film is comprised of biaxially oriented polypropylene-based film and/or has a thickness of between 25 and 50 $\mu$m.

12. The tape as claimed in claim 4, wherein the film is comprised of monoaxially oriented polypropylene-based film and/or has a thickness of between 40 and 130 $\mu$m.

* * * * *